(12) United States Patent
Tanaka

(10) Patent No.: US 7,773,144 B2
(45) Date of Patent: Aug. 10, 2010

(54) LENS DEVICE

(75) Inventor: Minoru Tanaka, Saitama (JP)

(73) Assignee: Fujinon Corporation, Saitama (JP)

(*) Notice: Subject to any disclaimer, the term of this patent is extended or adjusted under 35 U.S.C. 154(b) by 899 days.

(21) Appl. No.: 11/219,910

(22) Filed: Sep. 7, 2005

(65) Prior Publication Data

US 2006/0055810 A1    Mar. 16, 2006

(30) Foreign Application Priority Data

Sep. 15, 2004    (JP) .............................. 2004-268498

(51) Int. Cl.
*H04N 5/225* (2006.01)
*G02B 27/10* (2006.01)
*G02B 13/16* (2006.01)
*G03B 41/00* (2006.01)
*G03B 35/00* (2006.01)

(52) U.S. Cl. .................. 348/344; 348/343; 348/345; 348/335; 348/340; 396/322; 396/325

(58) Field of Classification Search .................. 348/343, 348/344, 345–357; 396/322–340, 354–359
See application file for complete search history.

(56) References Cited

U.S. PATENT DOCUMENTS

| 3,337,685 | A | | 8/1967 | Bougie |
| 3,653,747 | A | | 4/1972 | Kogelnik |
| 4,058,833 | A | | 11/1977 | Meyer |
| 4,422,740 | A | * | 12/1983 | Kawai et al. ................ 396/133 |
| 4,646,140 | A | * | 2/1987 | Bailey et al. ............. 348/217.1 |
| 6,227,726 | B1 | * | 5/2001 | Higuchi ...................... 396/358 |
| 6,305,853 | B1 | | 10/2001 | Bishay et al. |
| 6,477,327 | B1 | | 11/2002 | Imai |
| 6,630,959 | B1 | * | 10/2003 | Shono ......................... 348/344 |
| 7,006,140 | B2 | * | 2/2006 | Shono ......................... 348/349 |
| 7,061,526 | B2 | * | 6/2006 | Nakayama et al. ....... 348/218.1 |
| 7,397,501 | B2 | * | 7/2008 | Afsenius .................. 348/218.1 |

(Continued)

FOREIGN PATENT DOCUMENTS

EP    0 930 779 A2    7/1999

(Continued)

OTHER PUBLICATIONS

Extended European Search Report dated Dec. 29, 2005, for European Application No. EP 05 01 8491.

*Primary Examiner*—Sinh Tran
*Assistant Examiner*—Christopher K Peterson
(74) *Attorney, Agent, or Firm*—Harness, Dickey & Pierce, P.L.C.

(57) ABSTRACT

A lens device, in which object light is branched by a half mirror after passing through a photographic lens to allow photographing with two photographing means and in which the half mirror can be retracted from the optical axis to obtain a clear image using one of the photographing means, is provided. The half mirror in the lens device is provided between a front-side relay lens and a rear-side relay lens, and is provided such that the half mirror can be retracted away from an optical axis of the photographic lens and advanced toward from the optical axis. The rear-side relay lens is moved along the optical axis to a position in accordance with the retracting of advancing of the half mirror.

9 Claims, 3 Drawing Sheets

U.S. PATENT DOCUMENTS

| | | | |
|---|---|---|---|
| 7,417,682 B2 * | 8/2008 | Kuwakino et al. | 348/345 |
| 2002/0186304 A1 * | 12/2002 | Kono et al. | 348/216.1 |
| 2003/0173518 A1 * | 9/2003 | Ozaki | 250/330 |
| 2004/0100690 A1 * | 5/2004 | Nakano et al. | 359/410 |
| 2005/0012843 A1 * | 1/2005 | Kuwakino et al. | 348/335 |
| 2005/0179807 A1 * | 8/2005 | Lin | 348/344 |

FOREIGN PATENT DOCUMENTS

| | | |
|---|---|---|
| JP | 57-086828 | 5/1982 |
| JP | 2000-162495 | 6/2000 |
| JP | 2004-94050 | 3/2004 |
| JP | 2004-094050 | 3/2004 |

* cited by examiner

LENS DEVICE

FIELD OF THE INVENTION

The present invention relates to a lens device and, more particularly, to a lens device to which a visible light camera to be used in the daytime and an infrared camera to be used at nighttime are connected so as to use the device for photographing day and night.

BACKGROUND ART OF THE INVENTION

JP-A-2004-94050 discloses a monitoring camera having a visible light camera to be used in the daytime and an infrared camera to be used at nighttime. According to JP-A-2004-94050, the two cameras share a single optical system, and visible light and infrared light which have passed through the optical system are divided by a beam splitting mirror toward the two cameras, respectively, to allow photographing with the two cameras. It is therefore possible to perform photographing day and night.

However, in the lens device disclosed in JP-A-2004-94050, since the quantity of visible light which has passed through the optical section is halved by the beam splitting mirror, the quantity of light incident on the visible light camera becomes small, and a problem has therefore arisen in that a clear image can not be obtained with the visible light camera.

SUMMARY OF THE INVENTION

The invention has been made taking such a situation into consideration, and an object of an illustrative, non-limiting embodiment of the invention is to provide a lens device in which two photographing means share a single optical system and which is capable of obtaining a clear image.

In order to achieve the above-described object, the invention provides the following means.

(1) A lens device includes a half mirror provided on an optical axis of a photographic lens (taking lens), wherein the lens device is connected to a first camera on a transmitting side of the half mirror and connected to a second camera on a reflecting side of the half mirror, and object light transmitted through the photographic lens is branched (or divided) by the half mirror toward the first camera and the second camera. The lens device is characterized in that it includes: a mirror moving unit that retracts the half mirror away from a position on the optical axis and advances the half mirror toward the position; and an optical system moving unit that moves an optical system disposed on the optical axis back and forth along the optical axis in accordance with the retracting and advancing operations of the half mirror.

According to the item (1), the half mirror disposed on the optical axis allows photographing to be simultaneously performed with the first camera and the second camera. When the half mirror is retracted from the optical axis, photographing can be performed only by the first camera. In this case, since the quantity of light incident on the first camera is not reduced by the half mirror, a clear image can be obtained. Further, according to the item (1), since the optical system is moved back and forth along the optical axis in accordance with the advancing and retracting operations of the half mirror, any defocus attributable to the advancing and retracting operations of the half mirror can be corrected.

(2) The invention provides a lens device according to the item (1), characterized in that the optical system is a relay lens disposed on the transmitting side of the half mirror. When the relay lens is moved as in the item (2), focusing can be corrected without any influence on a zooming operation or focusing operation.

(3) The invention provides a lens device according to the item (1) or (2), characterized in that the first camera is a television camera for photographing with visible light, and the second camera is an infrared camera for photographing with infrared light. According to the item (3), the half mirror disposed on the optical axis allows photographing to be performed with both of visible light and infrared light using the television camera and the infrared camera, respectively. Further, a clear image can be obtained with the television camera by retracting the half mirror from the optical axis.

With a lens device according to the invention, since the half mirror can be retracted away from a position on an optical axis and advanced toward the position, photographing can be performed by two cameras simultaneously with the half mirror disposed on the optical axis, and a clear image can be obtained using one of the cameras by retracting the half mirror from the optical axis.

DETAILED DESCRIPTION OF THE INVENTION

Figure 1:
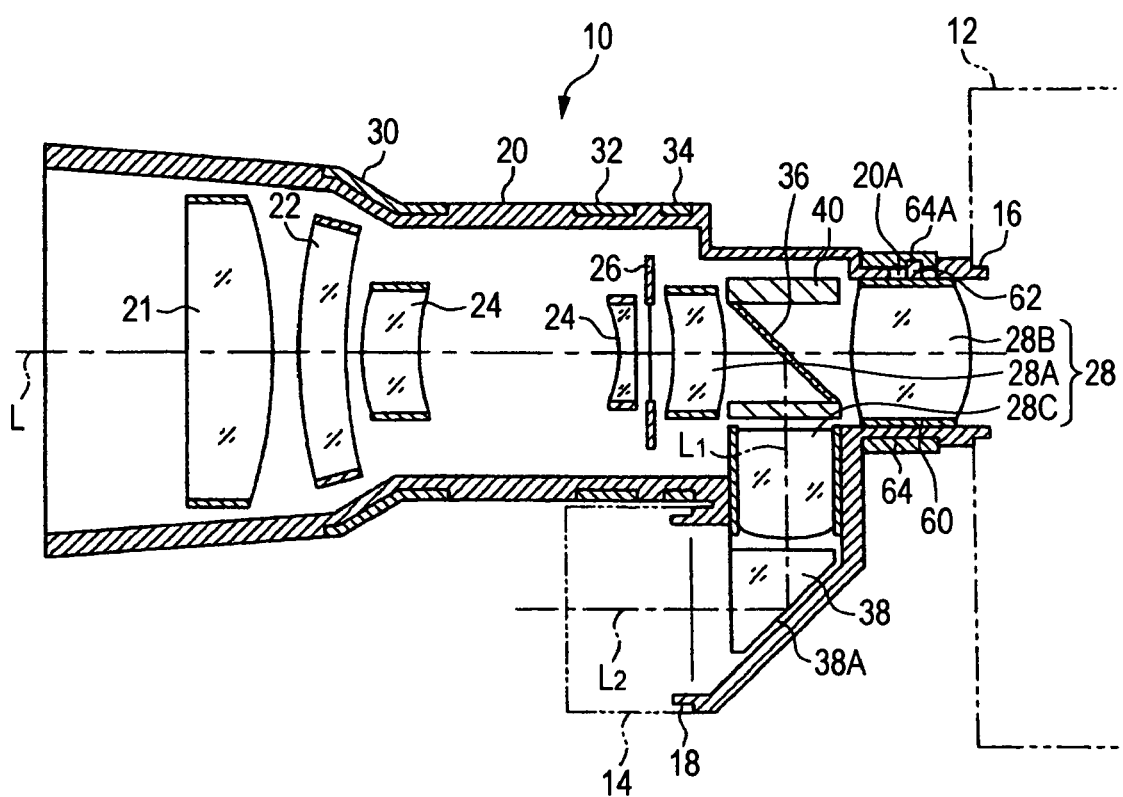
FIG. 1 shows a configuration of a television camera apparatus employing a lens device according to an illustrative, non-limiting embodiment of the invention.

An exemplary embodiment of a lens device according to the invention will now be described with reference to the accompanying drawings. FIG. 1 shows major components of a television camera apparatus employing a lens device according to an exemplary embodiment of the invention. As shown in FIG. 1, the television camera apparatus primarily includes a lens device 10, a television camera 12 for visible light (which corresponds to the first camera), and an infrared camera 14 (which corresponds to the second camera). The television camera 12 is detachably attached to a mount 16 provided at a rear end of the lens device 10, and the infrared camera 14 is detachably attached to a mount 18 formed at a lower part of the lens device 10 so as to extend toward the front side of the device.

The lens device 10 has a casing 20, and a fixed focus lens 21, a focus lens group 22, zoom lens groups 24, a diaphragm 26, and a relay optical system 28 are provided on an optical axis L in the main casing 20, the elements being listed in the order of their closeness to an object to be photographed. A focus ring 30, a zoom ring 32, and an iris ring 34 are rotatably supported on the main casing 20. When the focus ring 30 is rotated, the focus lens group 22 is moved back and forth along the optical axis L to adjust the focus to an object to be photographed. When the zoom ring 32 is rotated, the zoom lens groups 24 are moved back and forth along the optical axis L to adjust the focal length of the object. When the iris ring 34 is rotated, the aperture diameter of the diaphragm 26 is changed to adjust the stop value.

The relay optical system 28 includes a front-side relay lens 28A and a rear-side relay lens 28B, and a half mirror 36 is disposed between the front-side relay lens 28A and the rear-side relay lens 28B. The half mirror 36 is disposed at an inclination of approximately 45 degree to the optical axis L. As a result, a part of object light which has passed through the front-side relay lens 28A is perpendicularly reflected by the half mirror 36.

The object light that has been reflected by the half mirror 36 travels along an optical axis $L_1$ that is perpendicular to the optical axis L, passes through a rear-side relay lens 28C, and then falls on a reflecting prism 38. The light is perpendicularly reflected by a reflecting surface 38A of the reflecting prism 38, and the light then travels along an optical axis $L_2$ that is perpendicular to the optical axis $L_1$ (or in parallel with the optical axis L) and enters an image pickup unit (an image taking unit) (not shown) of the infrared camera 14 located ahead the same. Although the configuration of the image pickup unit will not be detailed, it includes an infrared filter for eliminating visible light to allow infrared light to impinge on a CCD for infrared light through the infrared filter.

Object light that has been transmitted through the half mirror 36 passes through the rear-side relay lens 28B and then impinges on an image pickup unit (not shown) of the television camera 12 for visible light. Although the configuration of the image pickup unit will not be detailed, the object light that has thus entered the image pickup unit is separated by, for example, a color-separation optical system i.e., into three colors, red light, green light, and blue light that falls on an image pickup surface of an image pickup device for projecting an image. Thus, a color image for broadcasting is photographed.

In the present embodiment, mirror-moving unit is provided to retract the half mirror 36 away from a position on the optical axis L and to advance the half mirror 36 toward the position. The mirror-moving unit will be described below.

Figure 2:
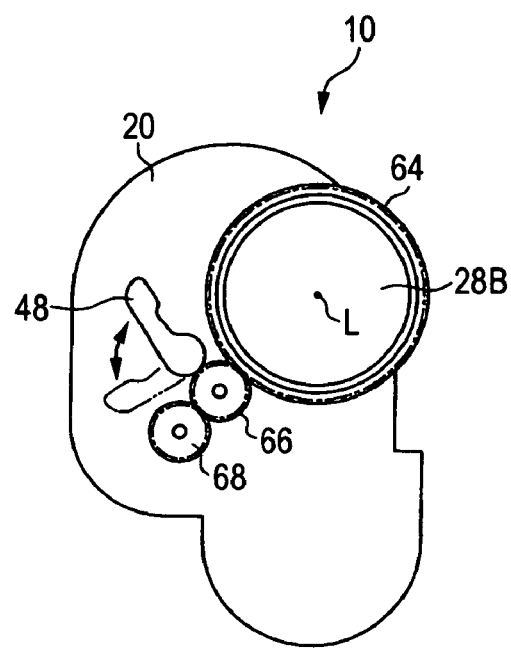
FIG. 2 is a rear view of the lens device in FIG. 1.
Figure 3:
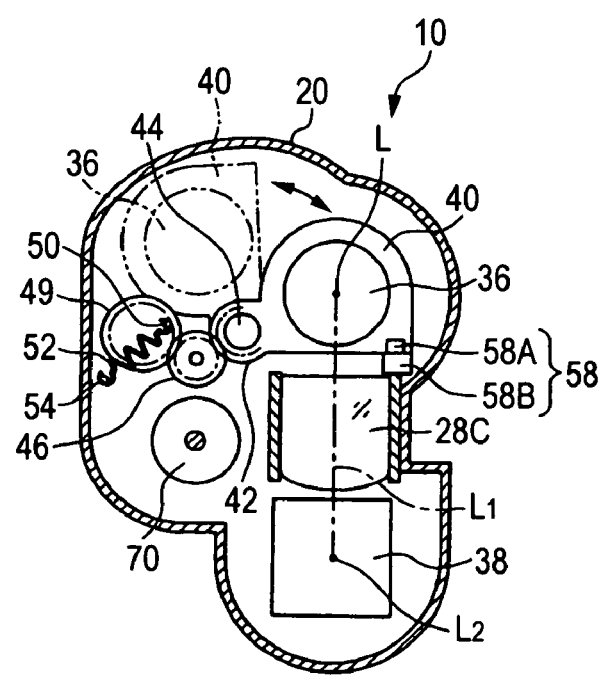
FIG. 3 is a sectional view of the lens device in FIG. 1 taken in the position of a half mirror.

FIG. 2 is a view of the lens device 10 taken from the rear side of the optical axis L, and FIG. 3 is a sectional view of the lens device 10 taken in the position of the half mirror 36.

As shown in FIG. 3, the half mirror 36 is held by a holding frame 40, and the holding frame 40 is rotatably supported by a support shaft 44 through a ring section 42 which is formed integrally with the frame. A gear is formed on an outer circumferential surface of the ring section 42, and the gear is linked with a gear 46. The gear 46 is formed integrally with an operation lever 48 which is shown in FIG. 2. The operation lever 48 is rotated to rotate the gear 46, and the holding frame 40 is rotated in conjunction with the gear through the ring section 42. Therefore, the half mirror 36 can be retracted away from the optical axis L and advanced toward the optical axis L by rotating the operation lever 48. Specifically, the half mirror 36 can be disposed in a position on the optical axis L (the position indicated by a solid line in FIG. 3) or completely retracted from the optical axis L to a retracted position (the position indicated by a two-dot chain line in FIG. 3).

A gear 49 is linked with the gear 46, and a pin 50 is erected on a side of the gear 49. One end of a spring 52 is hooked over the pin 50, and another end of the spring 52 is hooked over a pin 54 provided on the main casing 20. The spring 52 exerts an urging force on the gear 46 in a rotating direction thereof, which makes it possible to prevent vibration of the gear and generation of sounds attributable to abutment of the gear with its surroundings.

A movable contact 58A of a mirror position detector 58 including, for example, a sensitive switch is attached to the holding frame 40 of the half mirror 36. A fixed contact 58B of the mirror position detector 58 is attached to the main casing 20 such that it is put in contact with the movable contact 58A when the half mirror 36 is disposed on the optical axis L. Therefore, the mirror position detector 58 can detect whether the half mirror 36 is disposed on the optical axis L or not by detecting contact between the movable contact 58A and the fixed contact 58B. The rear-side relay lens 28B is moved back or forth along the optical axis L in accordance with the result of the detection by the mirror position detector 58. A mechanism for moving the rear-side relay lens 28B will be described below.

As shown in FIG. 1, a cam pin 62 is erected on an outer circumferential surface of a holding frame 60 for the rear-side relay lens 28B. The cam pin 62 is mounted such that it penetrates through a guide hole 20A formed on the main casing 20 to extend in the direction of the optical axis L. Further, the cam pin 62 is engaged with a cam groove 64A formed on an inner circumferential surface of a cam cylinder 64 that is rotatably supported by the main casing 20. Therefore, when the cam cylinder 64 is rotated, the holding frame 60 of the rear-side relay lens 28B is moved back or forth along the optical axis L.

As shown in FIG. 2, a gear is formed on an outer circumferential surface of the cam cylinder 64, and the gear is linked with a gear 68 through a gear 66. The gear 68 is connected to a driving shaft of a motor 70 which is shown in FIG. 3. Therefore, when the motor 70 is driven, the gear 68 rotates, and the cam cylinder 64 is rotated through the gear 66. Thus, the rear-side relay lens 28B can be moved back and forth along the optical axis L. A gear may be formed on the operation lever 48 to link it with the gear 66. In this case, the rear-side relay lens 28B can be moved back and forth by rotating the operation lever 48, and the half mirror 36 can be retracted away from the optical axis L and advanced toward the optical axis L by driving the motor 70.

Figure 4:
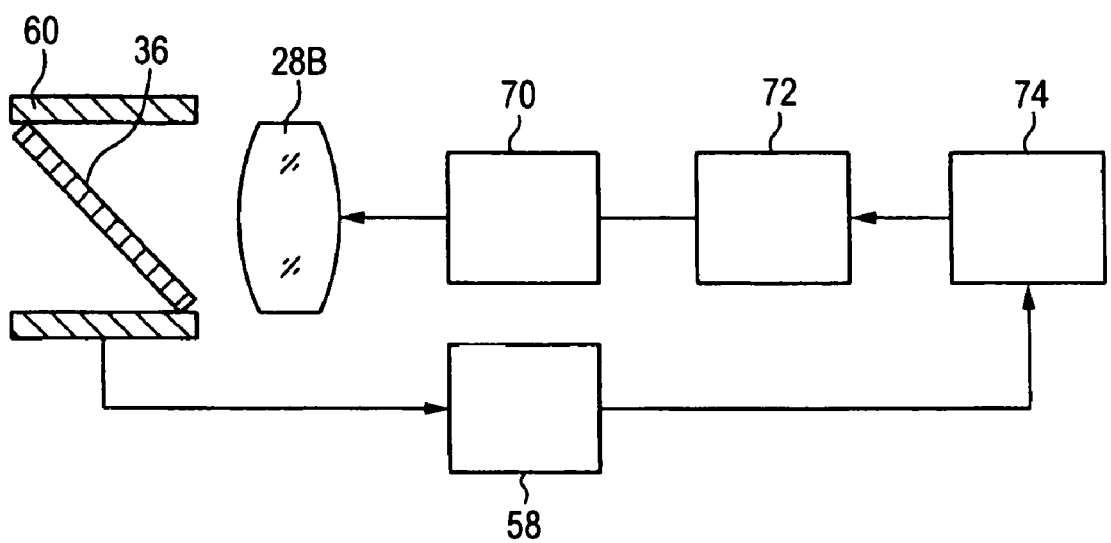
FIG. 4 is a block diagram of a control system of a rear-side relay lens.

FIG. 4 is a block diagram of a control system for the rear-side relay lens 28B. As shown in FIG. 4, a motor driving circuit 72 is connected to the motor 70 for driving the rear-side relay lens 28B, and a drive voltage is supplied to the motor 70 from the motor driving circuit 72. The motor driving circuit 72 is connected to a CPU 74, and a control signal from the CPU 74 is supplied to the motor driving circuit 72. The mirror position detector 58 is connected to the CPU 74 to supply a detection signal from the detector to the CPU 74. When a detection signal from the mirror position detector 58 is input, the CPU 74 outputs a control signal to the motor driving circuit 72 to drive the motor 70, and the rear-side relay lens 28B is thereby moved along the optical axis L. Therefore, the rear-side relay lens 28B is moved in conjunction with the retracting and advancing operations of the half mirror 36 to adjust the position of the lens. The position of the rear-side relay lens 28B is adjusted to a position for correcting a defocus which occurs depending on whether the half mirror 36 is located on the optical axis L or not.

An operation of the television camera apparatus having the above-described configuration will now be described.

Normally, photographing is simultaneously performed by both of the television camera 12 and the infrared camera 14. In this case, the half mirror 36 is disposed on the optical axis L as shown in FIG. 1. Thus, a part of object light which has passed through the front-side relay lens 28A is reflected downward by the half mirror 36 and then reflected forward by the reflecting prism 38 to impinge on the infrared camera 14. Object light that has been transmitted through the half mirror 36 passes through the rear-side relay lens 28B to enter the television camera 12. It is therefore possible to perform photographing with both of the infrared camera 14 and the television camera 12 simultaneously.

When it is desired to obtain a high quality image using the television camera 12, the operation lever 48 shown in FIG. 2 is rotated. When the operation lever 48 is rotated, the half mirror 36 is retracted away from the optical axis L. Further, the rear-side lens 28B is moved along the optical axis L to a position in conjunction with the retraction of the half mirror 36. Therefore, object light that has been transmitted through the front-side relay lens 28A passes through the rear-side relay lens 28B as it is and enters the television camera 12. Since the quantity of light incident on the television camera 12 is not reduced in the position of the half mirror 36, a clear image can be obtained. The retraction of the half mirror 36 may result in a defocus because the optical path length varies depending on whether the half mirror 36 is located on the optical path or not. However, such a defocus can be prevented because the rear-side relay lens 28B is moved.

In the lens device 10 of the present embodiment, the half mirror 36 is retracted away from the optical axis L and advanced toward the optical axis L as thus described. It is therefore possible to perform photographing simultaneously with both of the television camera 12 and the infrared camera 14 and to perform photographing with high quality using only the television camera 12. Further, since the rear-side relay lens 28B is moved in accordance with the retraction or advance of the half mirror 36, any defocus attributable to the retraction or advance of the half mirror 36 can be corrected. More particularly, since a defocus is corrected by moving the rear-side relay lens 28B in the present embodiment, zooming and focusing operations will not be adversely affected by the correction.

Further, the lens device 10 of the present embodiment can be made small because the television camera 12 and the infrared camera 14 use a common optical system (including the fixed focus lens 21, the focus lens group 22, the zoom lens groups 24, the diaphragm 26, and the front-side relay lens 28A). The device is therefore suitable for use in, for example, a television camera apparatus loaded on a helicopter.

While the invention is applied to a combination of the television camera 12 for photographing with visible light and the infrared camera 14 for photographing with infrared light in the above-described embodiment, this is not limiting the invention, and a camera for still images may be provided instead of the infrared camera 14, for example.

In the above-described embodiment, the television camera 12 is disposed on the transmitting side of the half mirror 36, and the infrared camera 14 is disposed on the opposite side of the half mirror 36. Alternatively, the infrared camera 14 may be disposed on the transmitting side, and the television camera 12 may be disposed on the opposite side.

The mirror-moving unit for retracting the half mirror 36 away from the optical axis L and advancing the half mirror 36 toward the optical axis L is not limited to that in the above-described embodiment. For example, the half mirror 36 may be translated in a direction perpendicular to the optical axis L. Alternatively, the half mirror 36 may be retracted away from the optical axis L and advanced toward the optical axis L by rotating the half mirror 36 about the top end of the half mirror 36 serving as a fulcrum.

Further, while the rear-side relay lens 28B is moved in accordance with the retraction and advance of the half mirror 36 in the above-described embodiment, a defocus may alternatively be corrected by moving another optical system such as the front-side relay lens 28A.

It will be apparent to those skilled in the art that various modifications and variations can be made to the described preferred embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2004-268498, filed Sep. 15 of 2004, the contents of which is incorporated herein by reference.

What is claimed is:

1. A lens device, comprising:
   a photographic lens having an optical axis;
   a half mirror on the optical axis, the photographic lens being on a light incident side of the half mirror; wherein the lens device is connected to a first camera on a light transmitting side of the half mirror and connected to a second camera on a light reflecting side of the half mirror, and object light transmitted through the photographic lens is divided by the half mirror toward the first camera and the second camera; and
   an optical system on the optical axis, the optical system being located on the light transmitting side of the half mirror;
   a mirror moving unit that retracts the half mirror away from a position on the optical axis and advances the half mirror toward the position on the optical axis; and
   an optical system moving unit that moves the optical system along the optical axis in accordance with a movement of the half mirror, the optical system moving unit correcting defocus attributable to both the retracting and the advancing of the half mirror.

2. The lens device according to claim 1, wherein the optical system is a first relay lens.

3. The lens device according to claim 1, further including:
   a second relay lens located on the light reflecting side of the half mirror between the half mirror and the second camera.

4. The lens device according to claim 3, further including:
   a third relay lens on the optical axis located on a light incident side of the half mirror, wherein the half mirror is between the optical system and the third relay lens.

5. The lens device according to claim 1, wherein the half mirror is retracted by rotating around an axis parallel to the optical axis.

6. The lens device according to claim 1, wherein the half mirror maintains a fixed angle to the optical axis before and after the retraction.

7. The lens device according to claim 1, further comprising:
   a main casting;
   a holding frame in the main casting, holding the half mirror;
   a movable contact attached to the holding frame; and
   a fixed contact attached to the main casting; wherein
      the movable contact contacts the fixed contact when the half mirror is on the optical axis; and
      the movable contact is separated from the fixed contact when the half mirror is retracted away from the optical axis.

8. A lens device, comprising:
   a photographic lens having an optical axis;
   a half mirror on the optical axis, the photographic lens being on a light incident side of the half mirror; wherein the lens device is connected to a first camera on a light transmitting side of the half mirror and connected to a second camera on a light reflecting side of the half mirror, and object light transmitted through the photographic lens is divided by the half mirror toward the first camera and the second camera; and
   an optical system on the optical axis, the optical system being located on the light transmitting side of the half mirror;

a mirror moving unit that retracts the half mirror away from a position on the optical axis and advances the half mirror toward the position on the optical axis; and an optical system moving unit that moves the optical system only along the optical axis in accordance with a movement of the half mirror.

9. A lens device, comprising:

a photographic lens having an optical axis;

a half mirror on the optical axis, the photographic lens being on a light incident side of the half mirror; wherein the lens device is connected to a first camera on a light transmitting side of the half mirror and connected to a second camera on a light reflecting side of the half mirror, and object light transmitted through the photographic lens is divided by the half mirror toward the first camera and the second camera; and an optical system on the optical axis, the optical system being located on the light transmitting side of the half mirror;

a mirror moving unit that retracts the half mirror away from a position on the optical axis and advances the half mirror toward the position on the optical axis; and an optical system moving unit that moves the optical system along the optical axis in accordance with a movement of the half mirror, the optical system moving unit including at least two rotating gears.

* * * * *